United States Patent
Groell (10) Patent No.: US 9,127,922 B2
(45) Date of Patent: Sep. 8, 2015

(54) PROBE AND METHOD FOR OPERATING A PROBE

(75) Inventor: Klaus Groell, Waging am See (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 550 days.

(21) Appl. No.: 13/425,594

(22) Filed: Mar. 21, 2012

(65) Prior Publication Data
US 2012/0242326 A1 Sep. 27, 2012

(30) Foreign Application Priority Data

Mar. 24, 2011 (DE) .......................... 10 2011 006 017
Oct. 19, 2011 (DE) .......................... 10 2011 084 755

(51) Int. Cl.
*G01R 1/30* (2006.01)
*G01B 7/012* (2006.01)
*G01B 21/04* (2006.01)

(52) U.S. Cl.
CPC .............. *G01B 7/012* (2013.01); *G01B 21/047* (2013.01); *G01B 2210/58* (2013.01)

(58) Field of Classification Search
CPC .......................... G01R 31/026; G01R 31/1236
USPC ........................................ 324/111; 320/166
See application file for complete search history.

(56) References Cited

U.S. PATENT DOCUMENTS

| 5,889,388 | A * | 3/1999 | Cameron et al. ............... 320/166 |
| 6,984,999 | B2 * | 1/2006 | Groell ........................ 324/754.07 |
| 7,203,077 | B2 * | 4/2007 | Bushnell ........................... 363/17 |
| 7,464,483 | B2 * | 12/2008 | Schopf et al. .................... 33/558 |
| 2004/0184415 | A1 * | 9/2004 | Groell ............................ 370/277 |
| 2008/0017726 | A1 | 1/2008 | Neumann |
| 2009/0265946 | A1 | 10/2009 | Jordil et al. |

FOREIGN PATENT DOCUMENTS

EP 1 557 639 7/2005
EP 1 742 011 1/2007

OTHER PUBLICATIONS

European Search Report, dated Jul. 9, 2012, issued in corresponding European Patent Application No. 11185720.7.

* cited by examiner

*Primary Examiner* — Melissa Koval
*Assistant Examiner* — Stephen G Armstrong
(74) *Attorney, Agent, or Firm* — Kenyon & Kenyon LLP (57) ABSTRACT

A probe is configured such that an output current pulse is able to be delivered by the charge storage at defined intervals to a load. A mean power to be fed to the charge storage is ascertainable for a subsequent time interval, and the level of the mean input power, which is to be drawn by the voltage transformer from the power source, is specifiable as a function of the ascertained mean power. The voltage transformer is controllable accordingly.

5 Claims, 7 Drawing Sheets

PROBE AND METHOD FOR OPERATING A PROBE

CROSS-REFERENCE TO RELATED APPLICATIONS

The present application claims priority to Application No. 10 2011 006 017.0, filed in the Federal Republic of Germany on Mar. 24, 2011, and to Application No. 10 2011 084 755.3, filed in the Federal Republic of Germany on Oct. 19, 2011, each of which is expressly incorporated herein in its entirety by reference thereto.

FIELD OF THE INVENTION

The present invention relates to a probe and to a method for operating a probe.

BACKGROUND INFORMATION

Probes are used, for example, to determine the positions of workpieces which are clamped in material-working machines, such as milling machines. A probe is usually a component of a probe system that often has a stationary transceiver unit. The transceiver unit is normally secured to an immovable element of the material-working machine. The probe may be mounted on a movable element of the material-working machine, for instance, on a milling spindle. In this context, the probe includes a feeler or probe element that is deflectable out of a rest position and that generates a switching signal in response to a deflection out of its rest position. Rest position of the probe element should be understood to be a position of the probe element in which it has no contact with a workpiece. In response to contact of the probe element with the workpiece, the probe element is deflected out of its rest position.

In what are referred to as wireless probe systems, the corresponding switching signal is transmitted by the probe as an electromagnetic signal, especially as an infrared signal or radio signal, to the stationary transceiver unit. In the transceiver unit, the output signals of the probe system are analyzed in order to determine the occurrence of switching signals (thus, a deflection of the probe element).

Such a probe often has a power source in the form of one or more batteries for its energy supply. There is a constant desire to increase the availability performance of such probe systems, which is why there is an effort to maximize the service life of the voltage sources.

European Patent No. 1 557 639, for example, describes a battery-operated probe, where the intention is to prolong the service life of the batteries in particular by the use of a voltage transformer, which ultimately improves the availability of the respective probe, because standstill times due to exhausted batteries are less frequent.

SUMMARY

Example embodiments of the present invention provide a probe and a method for operating a probe, in which the availability of a probe is increased.

According to example embodiments of the present invention, the probe has a power source for its energy supply. The power source is connected electrically to a voltage transformer. The voltage transformer is controllable by a device for monitoring the input power of the voltage transformer, a voltage being able to be generated at the output of the voltage transformer which is higher than the output voltage of the power source. Moreover, a charge storage, which is chargeable electrically with the aid of the voltage transformer, is connected electrically to the output of the voltage transformer. The probe is configured such that: an output current pulse is able to be delivered by the charge storage at defined intervals to a load having a current demand variable over time, especially having a pulse-shaped current demand; a mean power to be fed to the charge storage is ascertainable for a subsequent time interval; the magnitude of the mean input power to be drawn from the power source by the voltage transformer is specifiable as a function of this ascertained mean power, and the voltage transformer is controllable accordingly.

Following the control, the mean input power is then able to be supplied to the voltage transformer, i.e., a mean input current may be transferred by the voltage transformer from the power source to the charge storage.

Advantageously, the load may be in the form of a transmitting stage, so that an electromagnetic signal is able to be generated by the transmitting stage.

In the following, the device for monitoring the input power may be arranged, for example, as a CPU. The power source may be implemented as a direct current source, especially as one or more batteries. The batteries may include a non-rechargeable batteries and/or rechargeable batteries. According to the terminology customary in physics, the term power should be understood to be an energy, e.g., electrical energy, specific to a time interval.

Furthermore, one or more capacitors, or one or more electrochemical double-layer capacitors may be used as charge storage, for example.

The voltage transformer may include a switch, particularly in the form of a transistor, which is connected electrically to the device for monitoring the input power. This electrical connection is used in particular to control the switch along the lines of a pulse-width modulation or a pulse-frequency modulation.

In particular, the probe may include a circuit for determining a voltage applied to the input of the voltage transformer. Alternatively or additionally, the probe may include a circuit for determining a voltage applied to the charge storage.

The device for monitoring the input power, thus, for example, a CPU, includes a circuit for determining a voltage applied to the input of the voltage transformer and/or a circuit for determining a voltage applied to the charge storage.

Moreover, example embodiments of the present invention provide a method for operating a probe. The probe has a power source for its energy supply, the power source being connected electrically to a voltage transformer, and the voltage transformer being controlled by a device for monitoring the input power. In this context, the voltage transformer generates a voltage at its output which is higher than the output voltage of the power source. Furthermore, a charge storage, which is charged electrically by the voltage transformer, is connected electrically to the output of the voltage transformer. In each case, the charge storage delivers an output current pulse at defined intervals to a load or consumer of electrical energy having a current demand variable over time. In addition, a mean power to be fed to the charge storage is ascertained for a subsequent time interval. The magnitude of the mean input power which is to be removed or drawn from the power source by the voltage transformer is specified as a function of this ascertained mean power. The voltage transformer is controlled by the device accordingly, so that the mean power to be fed is supplied to the charge storage.

The load may represent a transmitting stage, so that in each case, an electromagnetic signal is generated by the transmitting stage owing to the output current pulse delivered at defined intervals.

The voltage applied to the input of the voltage transformer may be determined, and an electric input current which is to be drawn by the voltage transformer from the power source may be specified as a function of this applied voltage and the mean input power, and the voltage transformer is controlled by the device accordingly, and is supplied with or traversed by the input current specified.

During the time in which the voltage applied to the input of the voltage transformer is determined, the power source may be disconnected from power consumers of the probe, especially from the voltage transformer, so that a voltage is determined at reduced load for the power source, i.e., a no-load voltage of the power source is determined.

The voltage applied to the charge storage may be determined. The mean power to be fed to the charge storage for a subsequent time interval is ascertained on the basis of the determined voltage applied to the charge storage. To ascertain the mean power to be fed to the charge storage, in particular, the voltage applied to the charge storage may be compared to a predefined setpoint value for the voltage in question. After suitable signal processing, the applied voltage may be available as a digital value.

The voltage transformer may be controlled with the aid of pulse-width modulation.

The mean power to be fed to the charge storage may be ascertained for a time interval $\Delta T$, which is defined according to the relationship $\Delta T = n \cdot T$. In this context, T represents the interval at which the charge storage in each case delivers an output current pulse to a load, and n should be understood as a natural number greater than or equal to 1. For example, n is a number smaller than 10.

Moreover, an electric input current which the voltage transformer draws off from the power source may flow over a period of time of at least 0.75 T within interval T. In particular, the period of time may amount to at least 0.85 T, e.g., at least 0.90 T.

The electric input current which the voltage transformer draws from the power source may be held constant over a period of time of at least 0.75 T within interval T. In particular, the period of time may amount to at least 0.85 T, e.g., at least 0.90 T.

Likewise, the electric power which the voltage transformer draws from the power source may be held constant over a period of time of at least 0.75 T within interval T. In particular, the period of time may amount to at least 0.85 T, e.g., at least 0.90 T.

Intervals T may be selected to be equal.

Defined intervals T may have a length in the range between 5 ms and 100 ms.

A period of time within which the output current pulse is delivered to the load may be at least 10 times smaller, e.g., at least 100 times smaller than the interval to the delivery of the next output current pulse.

In particular, the probe described herein may provide that the batteries are usable for a longer time, i.e., that more energy of the batteries is usable, because an exceedingly careful removal of the electric power from the battery is possible.

Further features and aspects of example embodiments of the present invention are described in more detail below with reference to the appended Figures.

DETAILED DESCRIPTION

Figure 1:
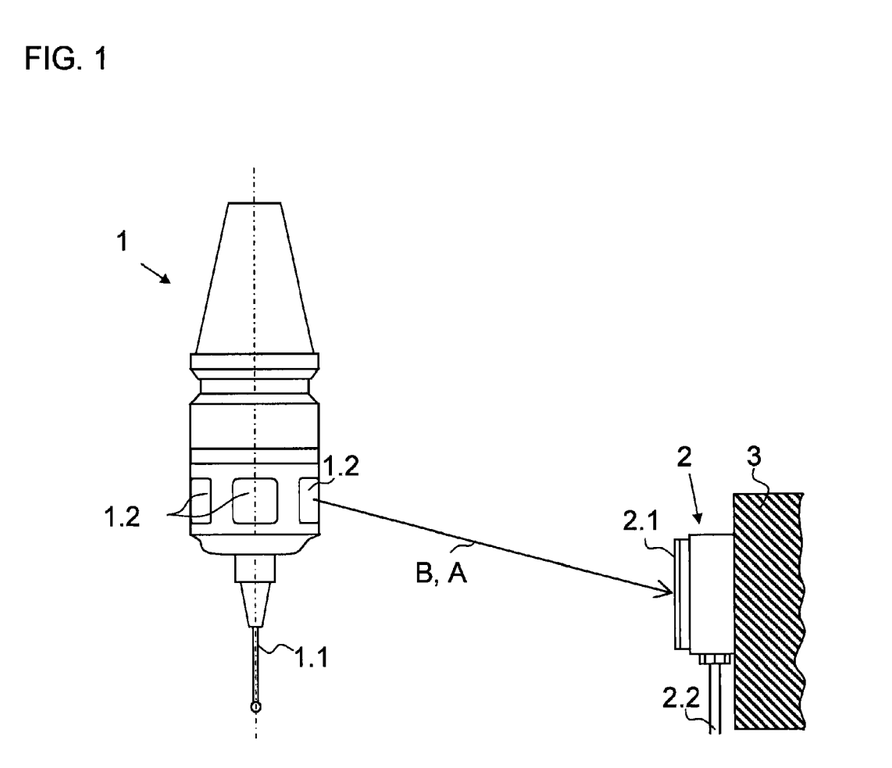
FIG. 1 schematically illustrates a probe system.

FIG. 1 shows a probe 1 which may be clamped into a machine tool using a clamping cone. For measuring purposes, a cylindrical feeler 1.1 having a probing contact sphere at one end is provided on probe 1.

The probe system also includes a transceiver unit 2 which is fixed in position on a stationary component 3 of the machine tool, so that probe 1 is thus mobile with respect to transceiver unit 2, thus, is movable relative thereto.

In the exemplary embodiment shown, six transceiver elements 1.2 are distributed over the circumference of probe 1, each secured so as to be offset by 60° along a circumferential line on probe 1. With the aid of transceiver elements 1.2, electromagnetic signals, e.g., infrared signals, may be emitted which are able to be received by transceiver unit 2. In the same manner, a corresponding communication starting from transceiver unit 2 to transceiver elements 1.2 on probe 1 is possible. In the exemplary embodiment illustrated, so-called ready signals B and probe signals A, in particular, are able to be transmitted by probe 1.

Figure 2A:
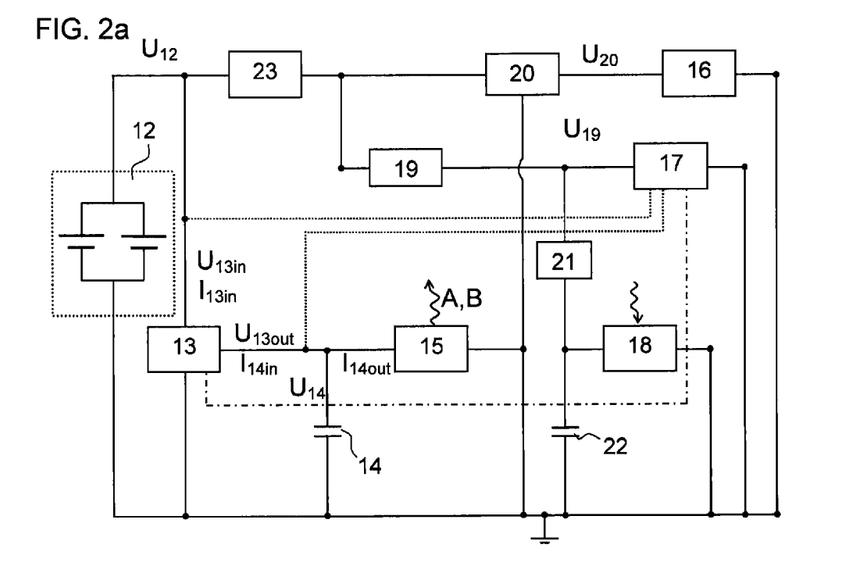
FIG. 2a is a schematic circuit diagram for a circuit in a probe.

FIG. 2 shows a schematic circuit diagram of a circuit as is situated within probe 1 on a printed-circuit board according to a first exemplary embodiment. Accordingly, the circuit includes a power source 12 which, in the exemplary embodiment shown, includes two lithium batteries having a rated voltage of 3.6 V in each case, so that one may speak of a direct current source here, as well. The lithium batteries are connected in parallel, so that in the ideal case, voltage or power source 12 provides a voltage $U_{12}$ of 3.6 V. The negative pole of power source 12 is connected to ground. Power source 12 is used to supply energy to, e.g., a sensor unit 16, a CPU 17, a transmitting stage 15 and a receiving stage 18. Transmitting stage 15, upstream from which is a charge storage 14, may also be denoted as a load having a current demand variable over time. A capacitor having a capacitance $C_{14}$ of 300 μF is used as charge storage 14 in the exemplary embodiment illustrated. Alternatively, a plurality of parallel-connected capacitors may be used, as well. The circuit also includes an RC filter circuit, including a resistor 21 and a capacitor 22.

In order to make a sufficiently high voltage available for the respective components, the circuit has voltage transformers 13, 23. Power source 12 is connected electrically to a voltage transformer 13 and supplies it with electrical energy. Accordingly, voltage transformer 13 is thus connected between power source 12 and the specified load, thus, transmitting stage 15. According to FIG. 2b, voltage transformer 13 includes a capacitor 13.1, a coil 13.2, a transistor 13.3, as well as a diode 13.4 and a further capacitor 13.5. These components are interconnected in accordance with FIG. 2b. In the exemplary embodiment illustrated, capacitors 13.1, 13.5 in each case have a capacitance of 10 μF. Voltage transformer 13 is able to generate a voltage $U_{13out}$ which lies above an input voltage $U_{13in}$, thus, above voltage $U_{12}$ of power source 12.

Figure 2B:
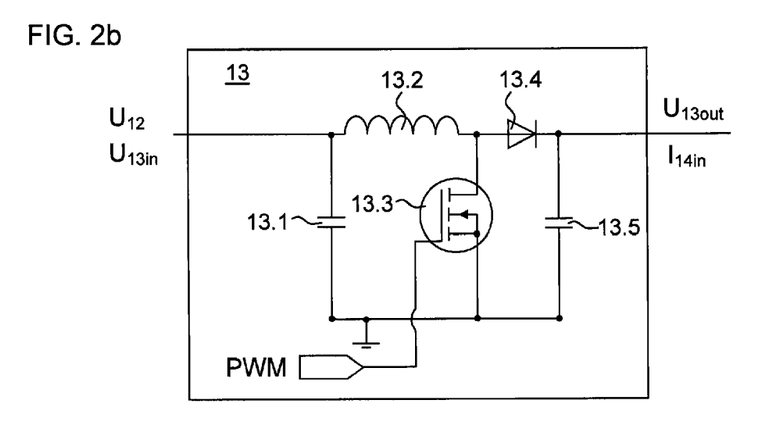
FIG. 2b is a schematic circuit diagram for a voltage transformer.

Transistor 13.3 is controlled by CPU 17 in a manner that a pulse-width modulation PWM may be carried out. When transistor 13.3 is switched on, the current through coil 13.2 increases and energy is stored in it accordingly. As soon as transistor 13.3 is switched off, the coil feeds charge storage 14 via diode 13.4. Thus, input power $P_{13in}$, which voltage transformer 13 draws from power source 12, may be monitored or controlled by CPU 17.

According to FIG. 2a, downstream from a further voltage transformer 23, the circuit includes two voltage limiters 19, which provide output voltages $U_{19}$, $U_{20}$ that are used simultaneously as input voltage for sensor unit 16 and for CPU 17, respectively. Since the electric current which flows through resistor 21 is very small, the input voltage into receiving stage 18 can be equated in good approximation with voltage $U_{19}$.

In order to transfer probe 1 from a battery-saving stand-by mode to a measuring-operation mode, a corresponding activation signal is dispatched by stationary transceiver unit 2. The activation signal is converted by receiving stage 18 of probe 1 from an infrared signal to an electrical signal which is then relayed to CPU 17. Thereupon, corresponding commands go from CPU 17 to the relevant components in probe 1, so that the probe system, i.e. the probe, is transferred into the measuring-operation mode.

Figure 7:
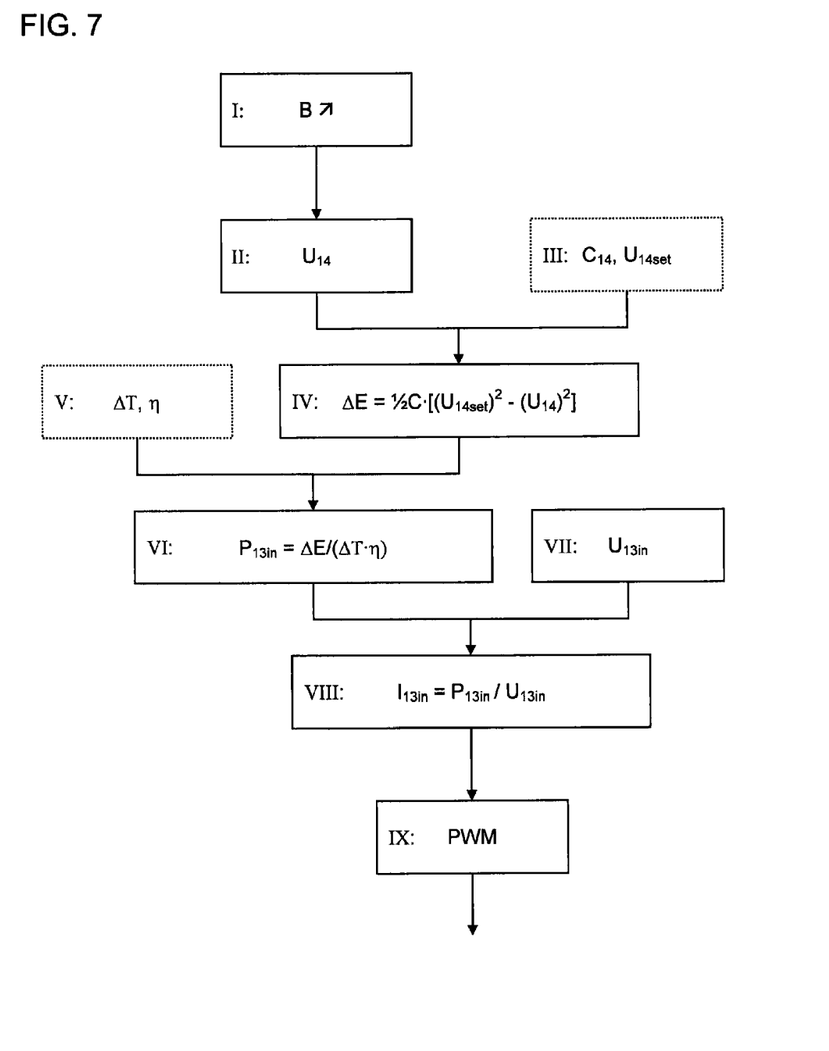
FIG. 7 shows a schematic flowchart of the method.

To signal that the measuring-operation mode is running, the probe transmits a ready signal B at defined intervals T, in the present case, a constant interval T of 20 ms between the sending of two temporally adjacent ready signals B during normal operation being predefined by CPU 17. In FIG. 7, in which a flow chart for the method for operating probe 1 is represented schematically, the generating of ready signal B is shown as step I.

Figure 3A:
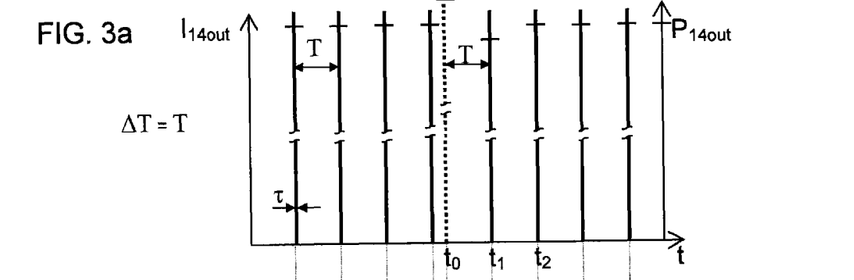
FIG. 3a shows a graph having output current pulses and output powers, respectively, delivered from a charge storage, plotted against time.

FIG. 3a shows a timing diagram with respect to the sending of output current pulses $I_{14out}$ which are delivered by charge storage 14 at intervals T=20 ms to transmitting stage 15. Due to the arrival of output current pulse $I_{14out}$, transmitting stage 15 generates an electromagnetic signal that is subsequently received by transceiver unit 2. For the time being, the intention is to discuss only the emitting of ready signals B which are represented by the solid vertical lines, therefore, for example, the four left output current pulses $I_{14out}$ in FIG. 3a, thus for t<$t_0$. Corresponding to output current pulse $I_{14out}$, an electric power $P_{14out}$ is supplied to transmitting stage 15, as shown by the short horizontal lines in conjunction with the ordinate on the right in FIG. 3a. The periods of time τ in which an output current pulse $I_{14out}$ exists amount to approximately 20 μs. For these brief periods of time τ, a comparatively high current on the order of 8 A flows into transmitting stage 15 during an output current pulse $I_{14out}$. Likewise, power $P_{14out}$ removed from charge storage 14 is relatively high during these periods of time τ.

Figure 3B:
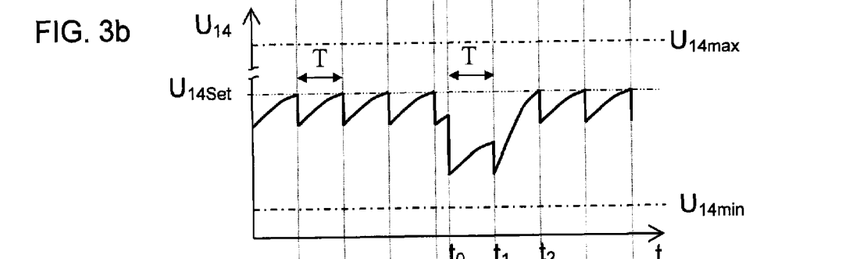
FIG. 3b shows a graph having the voltage at the charge storage over time.

FIG. 3b shows the characteristic of voltage $U_{14}$ at charge storage 14. In response to each emission of a ready signal B, voltage $U_{14}$ decreases by a few 100 mV, and then rises again over the following 20 ms corresponding to interval T. Actual voltage $U_{14}$ at charge storage 14 is determined after the dispatch of ready signal B. This measure is indicated as step II in the flow chart according to FIG. 7. In this context, according to FIG. 2a, voltage $U_{14}$ is supplied to CPU 17, CPU 17 including an analog-digital converter and a voltage-divider circuit, so that a 12-bit value is generated there as information about the level of voltage $U_{14}$.

Moreover, its capacitance $C_{14}$ is read out from a memory of CPU 17, as well as a setpoint value $U_{14Set}$ for voltage $U_{14}$ at charge storage 14 (step III in FIG. 7).

Next, energy ΔE to be fed is then calculated by CPU 17 according to the formula $$\Delta E = \frac{1}{2} \cdot C_{14} \cdot [(U_{14Set})^2 - (U_{14})^2]$$

as represented in FIG. 7 as step IV.

After that, time interval ΔT, during which a mean power $P_{14in}$ to be fed to charge storage 14 is to be applied, is read out from the memory of CPU 17. Likewise, a stored value η for the efficiency factor of the circuit in question (step V according to FIG. 7). Since ΔT=T was selected in the present case, first of all, interval T, which is stored in CPU 17, is read out.

Mean power $P_{14in}$ to be fed during a next time interval ΔT=T is then ascertained, using the formula $$P_{14in} = \Delta E / \Delta T$$

With ΔT=T, it follows for the first exemplary embodiment that:

$$P_{14in} = \Delta E / T$$

Taking into account a value η for the efficiency factor of the circuit in question, in step VI according to FIG. 7, the level of mean input power $P_{13in}$, which is to be drawn into voltage transformer 13, i.e., is to be taken from power source 12 during an interval T, is specified according to the following relationship:

$$P_{13in} = P_{14in} / \eta,$$

where 0<η≤1.

Figure 4A:
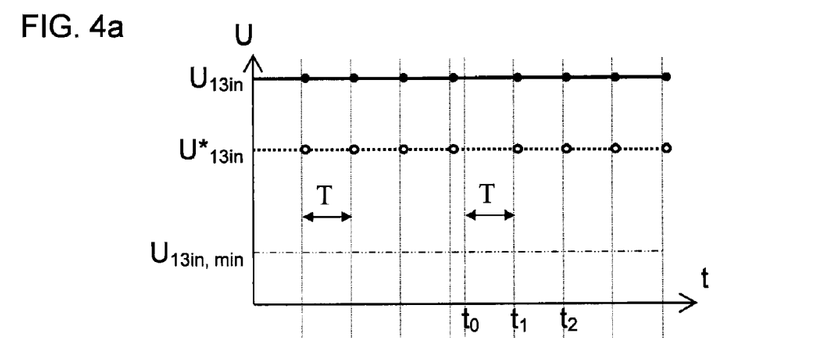
FIG. 4a shows a graph having two voltages applied alternatively to the voltage transformer plotted against time.

In the next step (step VII in FIG. 7), voltage $U_{13in}$ actually applied to voltage transformer 13 is determined at a time highlighted with dots. Usually, this voltage $U_{13in}$ is largely constant, since as a rule, voltage $U_{12}$ at the output of power source 12 does not fluctuate in this brief time. The time characteristic of voltage $U_{13in}$ is shown in FIG. 4a. The voltage is likewise determined in a circuit of CPU 17 with the aid of an analog-digital converter (see also FIG. 2a).

Since in normal operation, during the continuous emitting of ready signals B, thus, in FIGS. 3a to 3d and 4a to 4c during time t<$t_0$, a constant mean power $P_{14in}$ is also drawn from voltage transformer 13, mean input power $P_{13in}$ drawn from power source 12 is constant, as well.

With knowledge of the necessary level of input power $P_{13in}$, input current $I_{13in}$ to flow through voltage transformer 13 may be ascertained for present voltage $U_{13in}$ by the relationship $$I_{13in}=P_{13in}/U_{13in}$$

according to step VIII in FIG. 7.

A specific pulse-no-pulse ratio for the pulse-width modulation is set by CPU 17 as a function of input current $I_{13in}$ to be set for a following period of time according to interval T. Consequently, voltage transformer 13 is thus controlled by CPU 17 in accordance with previously ascertained input power $P_{13in}$, which was averaged over interval $\Delta T=T$ (see FIG. 2a and step IX in FIG. 7). Therefore, CPU 17 represents the device for monitoring input power $P_{13in}$.

Figure 3C:
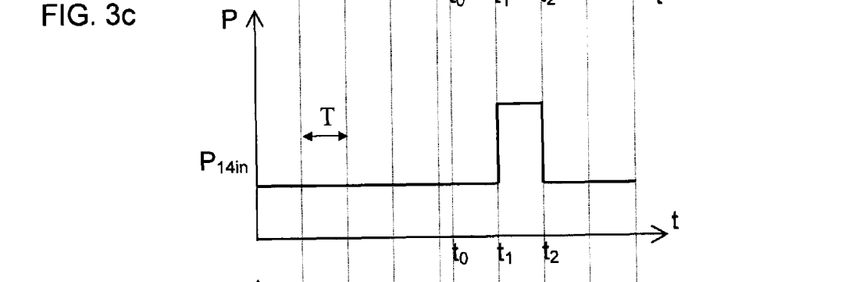
FIG. 3c shows a graph having the power supplied to the charge storage over time.
Figure 3D:
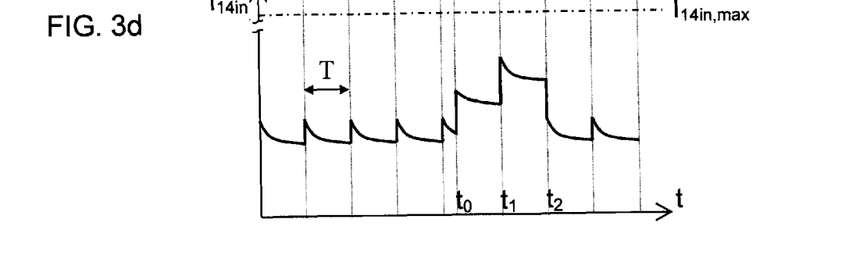
FIG. 3d shows a graph having the current supplied to the charge storage over time.
Figure 4B:
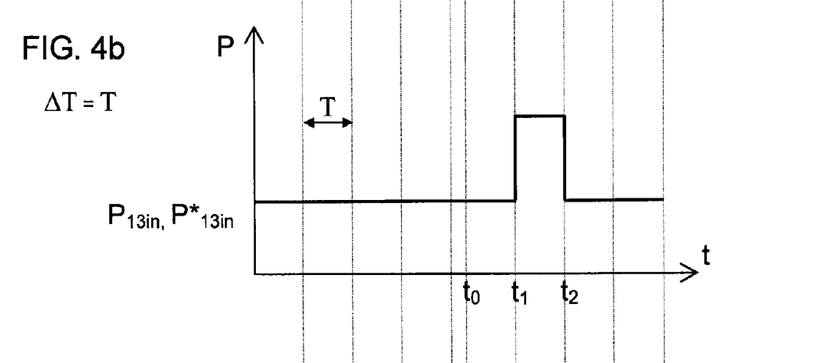
FIG. 4b shows a graph having the input power which is drawn by the voltage transformer from the power source plotted against time.
Figure 4C:
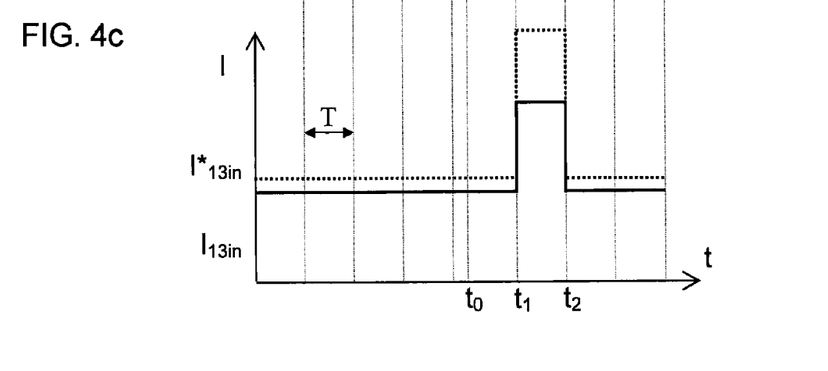
FIG. 4c shows a graph having two input currents flowing alternatively into the voltage transformer plotted against time.

According to the time characteristic as shown in FIG. 4b, input power $P_{13in}$ is then drawn off or removed from power source 12. Consequently, power $P_{14in}$ is supplied to charge storage 14 according to the characteristic in FIG. 3c, that is, a current $I_{14in}$ which corresponds to the characteristic according to FIG. 3d will flow into charge storage 14. According to the exemplary embodiment, input power $P_{13in}$ in each instance remains constant over entire interval T during time $t<t_0$. In this manner, a minimal loading of power source 12 may be achieved. In the same manner, maximum occurring input current $I_{13in}$ is minimized (FIG. 4c), which leads to a reduction in losses. In the exemplary embodiment illustrated, input current $I_{13in}$ amounts to approximately 8 mA in this operating state. Therefore, constant electric input current $I_{13in}$, which voltage transformer 13 draws from power source 12, thus always flows within interval T of 20 ms. In the same manner, electric power $P_{13in}$, which voltage transformer 13 draws from power source 12, is held constant within entire interval T.

Provided that no probing occurs, probe 1 will transmit ready signals B repeatedly at intervals T, which are subsequently received by transceiver unit 2.

If feeler 1.1 is deflected, a digital signal (change of a voltage level from high to low) is then generated in sensor unit 16. This signal is transmitted to CPU 17 where it is processed. The signal, processed by CPU 17, is then routed to transmitting stage 15, which generates probe signal A in the form of electromagnetic rays or signals. In the exemplary embodiments illustrated, the electromagnetic signals take the form of infrared signals; however, radio signals, for instance, may also be used. Probe signals A are received by stationary transceiver unit 2. Inside transceiver unit 2, the infrared signals are converted into electrical signals and conditioned. Finally, the conditioned electrical signals arrive via a cable 2.2 at stationary sequential electronics, where they are further processed.

According to the exemplary embodiment, a probing contact is detected at instant $t=t_0$ which, as described above, results in the transmitting of a probe signal A by transmitting stage 15 to transceiver unit 2. The electrical energy necessary for this is drawn largely from charge storage 14, so that at instant $t_0$, an output current pulse $I_{14out}$ thus flows out of charge storage 14 (see FIG. 3a) and correspondingly, at $t=t_0$, voltage $U_{14}$ at charge storage 14 drops according to FIG. 3b. Since at instant $t_0$, charge storage 14 has not yet reached its setpoint charge, that is, at instant $t_0$, $U_{14}$ is less than $U_{14set}$, voltage $U_{14}$ drops off further than was the case in normal operation during the periodic transmitting of ready signal B. However, at $t=t_0$, voltage $U_{14}$ lies above a predefined minimum voltage $U_{14min}$, so that proper operation of the probe is therefore not endangered. Output current pulse $I_{14out}$, which is followed by a dispatch of a probe signal A, is represented by a broken line in FIG. 3a. In the present exemplary embodiment, this output current pulse $I_{14out}$ is greater than output current pulses $I_{14out}$, represented with solid lines, which are necessary for transmitting ready signals B. The same observation holds true for applied power $P_{14out}$.

After a probe signal A has been dispatched, further transmission of a signal, e.g., a probe signal A or a ready signal B, is blocked within interval T in the exemplary embodiment illustrated.

After the dispatch of ready signal B, actual voltage $U_{14}$ at charge storage 14 is then determined again at instant $t=t_1=t_0+T$, and energy $\Delta E$ to be fed is calculated according to the formula $\Delta E=\frac{1}{2} \cdot C_{14} \cdot [(U_{14Set})^2-(U_{14})^2]$. Since voltage $U_{14}$ at charge storage 14 is comparatively low at instant $t_1$, a higher value than before is now calculated for energy $\Delta E$ to be fed. Thus, a mean power $P_{14in}=\Delta E/T$ to be fed to charge storage 14 is ascertained analogously to the method described above, since T remains unchanged.

Correspondingly, at instant $t_1$, taking value $\eta$ for the efficiency factor into consideration, the magnitude of mean input power $P_{13in}=P_{14in}/\eta$, which must be removed or drawn off by voltage transformer 13 from power source 12 during next interval $T=t_2-t_1$, is calculated, and input current $I_{13in}$ to be fed into the voltage transformer is specified. Following that, a specific pulse-no-pulse ratio is set by CPU 17 for the pulse-width modulation. Since voltage $U_{13in}$ has remained unchanged, a higher input current $I_{13in}$ (FIG. 4c) is drawn from power source 12 in the period of time between $t_1$ and $t_2$. Correspondingly, current $I_{14in}$ (FIG. 3d) supplied to charge storage 14, and supplied mean power $P_{14in}$ (FIG. 3c) increase within the period of time between $t_1$ and $t_2$, as well. Consequently, at instant $t_2=t_1+T$, voltage $U_4$ at charge storage 14 has setpoint value $U_{14Set}$ (FIG. 3b).

After that, ready signals B are dispatched again at intervals T during normal operation, so that the probe system operates as in period of time $t<t_0$ described above.

For the power source 12, it is possible to use different batteries, for example, which, according to FIG. 4a, are able to supply different voltages $U_{13in}$, $U^*_{13in}$. For the case where $U_{13in}>U^*_{13in}$, the result is $I_{13in}<I^*_{13in}$, since mean input power $P_{13in}=P^*_{13in}$ to be fed into voltage transformer 13 remains the same, see FIGS. 4b and 4c. Current $I_{14in}$ is largely independent of the level of voltages $U_{13in}$, $U^*_{13in}$.

In a further exemplary embodiment, illustrated in FIGS. 5a through 5d, the probe system is operated analogously to the first exemplary embodiment, so long as the probe is transmitting only ready signals B ($t<t_0$). In this operating state, thus, after the transmitting of a ready signal B, voltage $U_{14}$ at charge storage 14 is raised at intervals T in the direction of setpoint value $U'_{14Set}$, setpoint value $U'_{14Set}$ being set somewhat higher in the second exemplary embodiment than setpoint value $U_{14Set}$ of the first exemplary embodiment. As soon as a probing contact takes place, in the diagrams according to FIGS. 5a through 5d, at instant $t=t_0$, ultimately the transmitting of probe signal A from transmitting stage 15 to transceiver unit 2 is triggered, and the electrical energy necessary for this purpose is drained from charge storage 14, so that at $t=t_0$, voltage $U_{14}$ at charge storage 14 drops. Since at instant $t_0$, voltage $U_{14}$ is less than $U'_{14set}$ in the second exemplary embodiment, as well, voltage $U_{14}$ drops off further than was the case during the periodic sending of ready signals B. After the dispatch of probe signal A, further transmission of a signal, thus a probe signal A or a ready signal B, is prevented within interval T in the second exemplary embodiment, as well.

As in the first exemplary embodiment, after the dispatch of ready signal B, at instant $t=t_1$, actual voltage $U_{14}$ at charge storage 14 is likewise determined in the second exemplary embodiment. However, energy $\Delta E'$ to be fed is calculated according to the formula $$\Delta E' = \frac{1}{2} \cdot \{C_{14} \cdot \frac{1}{2}[(U'_{14Set})^2 - (U_{14})^2]\}$$

(here $\Delta E' = \frac{1}{2} \Delta E$ applies; incidentally, this relationship is true in the second exemplary embodiment for all instants at which actual voltage $U_{14}$ at charge storage 14 is determined).

Thus, a power to be fed to charge storage 14 is ascertained according to the formula $P'_{14in} = \Delta E'/T$.

Correspondingly, the magnitude of input power $P'_{13in} = \Delta E'/(T \cdot \eta) = P'_{14in}/\eta$ which voltage transformer 13 must draw from power source 12 is calculated, and input current $I'_{13in}$ to be fed into voltage transformer 13 is specified. CPU 17 sets a specific pulse-no-pulse ratio for the pulse-width modulation as a function of input current $I'_{13in}$ determined beforehand. Accordingly, power $P'_{14in}$ supplied to charge storage 14 increases within the period of time between $t_1$ and $t_2$, however, not to the extent as was the case in the first exemplary embodiment (see FIG. 5b).

Figure 5A:
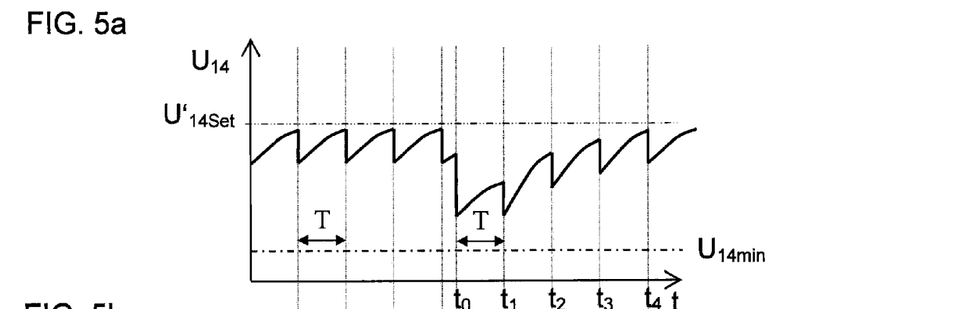
FIG. 5a shows a graph having the voltage at the charge storage over time.
Figure 5B:
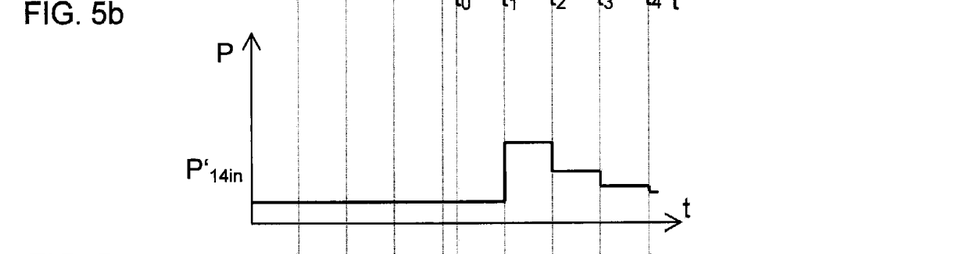
FIG. 5b shows a graph having the power supplied to the charge storage over time.
Figure 5C:
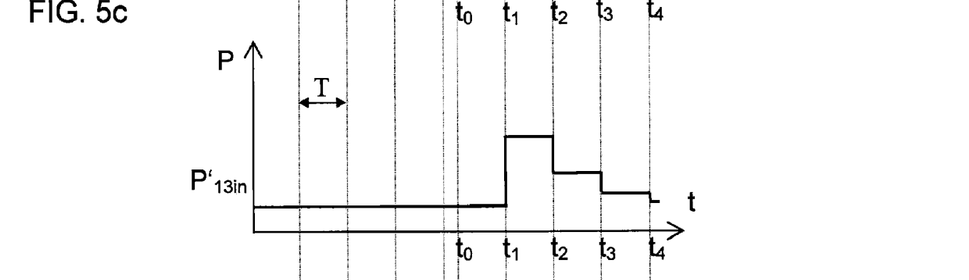
FIG. 5c shows a graph having the input power which is drawn by the voltage transformer from the power source plotted against time.
Figure 5D:
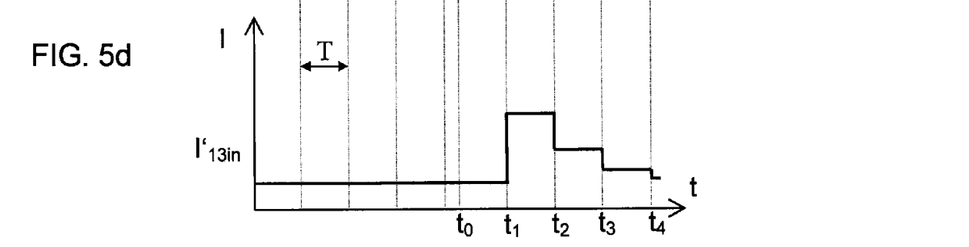
FIG. 5d shows a graph of the current flowing into the voltage transformer plotted against time.

Accordingly, the level of voltage $U_{14}$ at charge storage 14 approaches setpoint value $U'_{14Set}$ asymptotically, as shown in FIG. 5a. Since probe 1 is operable without difficulty at a voltage $U_{14}$, which, for example, is 60% of $U'_{14Set}$, the fact that purely arithmetically, voltage $U_{14}$ does not completely reach setpoint value $U'_{14Set}$ plays no role for the perfect operation of probe 1. Thus, in the second exemplary embodiment, the period of time for the feeding of the electrical energy is increased without, however, there having been a drop below the necessary minimum voltage $U_{14min}$ at charge storage 14. For the case when one or more probing processes take place within the period of time between $t_1$ and $t_3$, an appropriate automatic readjustment of input current $I'_{13in}$ to be fed into the voltage transformer would then be carried out, so that even in this case, there would not be a drop below the necessary minimum voltage $U_{14min}$ at charge storage 14.

Figure 6A:
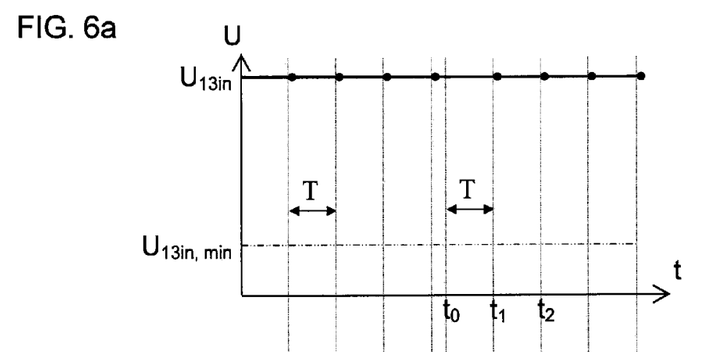
FIG. 6a shows a graph of the voltage applied to the voltage transformer plotted against time.
Figure 6B:
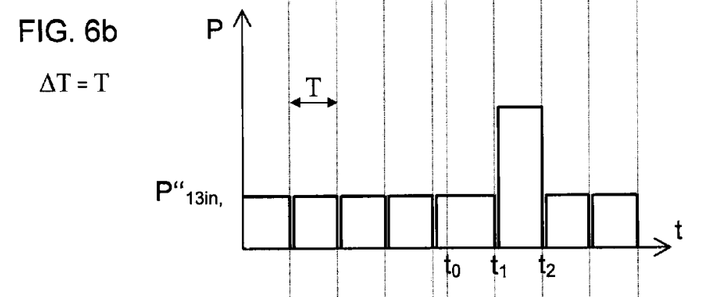
FIG. 6b shows a graph having the input power which is drawn by the voltage transformer from the power source plotted against time.
Figure 6C:
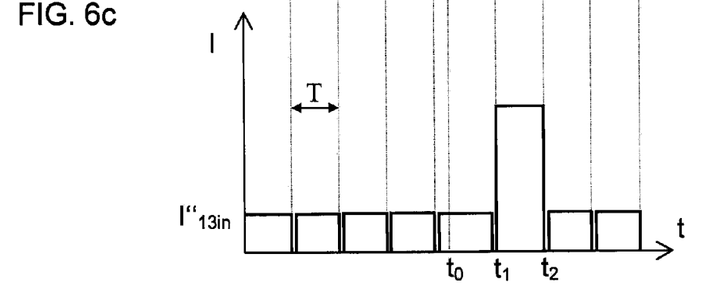
FIG. 6c shows a graph of the current flowing into the voltage transformer plotted against time.

A third exemplary embodiment is connection with FIGS. 6a through 6c. Output current pulses $I_{14out}$ are delivered by charge storage 14 to transmitting stage 15 analogously to the first exemplary embodiment, thus, according to FIG. 3a. In similar manner, FIGS. 3b, 3c and approximately, additionally 3d are applicable for the third exemplary embodiment, as well. Voltage $U_{13in}$ applied to voltage transformer 13 is to remain unchanged relative to the first exemplary embodiment, as shown in FIG. 6a.

In contrast to the preceding exemplary embodiments, however, input power $P'''_{13in}$ is now set to zero for an extremely short period (FIG. 6b), that is, the supply of input current $I'''_{13in}$ fed in is interrupted briefly. In each case, actual voltage $U_{13in}$ is determined precisely at these instants, so that the no-load voltage of power source 12 is quasi measured here. Voltage $U_{13in}$ determined in this manner is thus the basis for the calculation of the level of mean input current $I'''_{13in}$ and the level of mean input power $P'''_{13in}$, respectively, which are to be drawn by voltage transformer 13 from power source 12.

The result is that a battery becoming weaker as power source 12 is not brought immediately to breakdown by the charging of charge storage 14. The reason is that if voltage $U_{13in}$ is determined under load, in the case of a weak battery as power source 12, it is lower than the no-load voltage. However, at lower voltage $U_{13in}$, input current $I_{13in}$ to be fed in is calculated to be higher, and CPU 17 would control voltage transformer 13 such that it would draw a higher input power $P_{13in}$ from power source 12. Correspondingly, a weak battery as power source 12 would quickly break down completely. In accordance with the method of the third exemplary embodiment, it is possible to achieve at least a delayed breakdown of power source 12. For the case that power source 12 recovers again, this method is even able to prolong the service life of the battery as the power source 12 considerably.

Otherwise, the third exemplary embodiment corresponds to a great extent to the two first exemplary embodiments.

The representations in FIGS. 3a through 6c are not true to scale, but rather are intended to only qualitatively point out temporal relationships.

What is claimed is:

1. A probe, comprising:
   a feeler;
   a sensor unit;
   a CPU;
   a power source adapted to supply energy;
   a voltage transformer electrically connected to the power source and adapted to generate a voltage, at an output of the voltage transformer, higher than an output voltage of the power source;
   a device adapted to monitor input power and to control the voltage transformer; and
   a charge storage device electrically connected to the output of the voltage transformer, the charge storage device electrically chargeable by the voltage transformer;
   wherein the charge storage device is adapted to deliver an output current pulse at defined intervals to a load;
   wherein the load includes a transmitting stage adapted to generate an electromagnetic signal so that ready signals and probe signals are transmittable by the probe;
   wherein the sensor unit is adapted to generate a digital signal in response to deflection of the feeler and to transmit the digital signal to the CPU, the CPU adapted to process the digital signal and route the processed digital signal to the transmitting stage, the transmitting stage adapted to generate the probe signal as an electromagnetic ray and/or signal;
   wherein the probe is adapted to transmit a ready signal at defined intervals to signal that a measuring-operation mode is running; and
   wherein the device is adapted to ascertain a mean power to be fed to the charge storage for a subsequent time interval, to control the voltage transformer in accordance with the ascertained mean power to be fed to the charge storage for the subsequent time interval and a level of a mean input power, to be drawn by the voltage transformer from the power source, the level of mean input power being specifiable as a function of the ascertained mean power.

2. The probe according to claim 1, wherein the voltage transformer includes at least one of (a) a switch and (b) a transistor, electrically connected to the device.

3. The probe according to claim 1, further comprising a circuit adapted to determine a voltage applied to an input of the voltage transformer.

4. The probe according to claim 1, further comprising a circuit adapted to determine a voltage applied to the charge storage device.

5. The probe according to claim 1, wherein the device includes at least one of (a) a circuit adapted to determine a voltage applied to an input of the voltage transformer and (b) a circuit adapted to determine a voltage applied to the charge storage device.

* * * * *